United States Patent
Pfuhl et al.

(10) Patent No.: US 12,095,161 B2
(45) Date of Patent: Sep. 17, 2024

(54) MILLIMETER-WAVE CIRCUIT WITH DIELECTRIC LENS

(71) Applicant: Infineon Technologies AG, Neubiberg (DE)

(72) Inventors: Nadine Pfuhl, Munich (DE); Marwa Abdel-Aziz, Munich (DE); Ashutosh Baheti, Munich (DE); Saverio Trotta, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/461,080

(22) Filed: Aug. 30, 2021

(65) Prior Publication Data
US 2022/0077592 A1 Mar. 10, 2022

(30) Foreign Application Priority Data
Sep. 7, 2020 (EP) .................................... 20194867

(51) Int. Cl.
*H01Q 15/08* (2006.01)
*G01S 13/56* (2006.01)
*H01Q 19/30* (2006.01)

(52) U.S. Cl.
CPC .............. *H01Q 15/08* (2013.01); *G01S 13/56* (2013.01); *H01Q 19/30* (2013.01)

(58) Field of Classification Search
CPC ............ H01Q 5/25; H01Q 7/00; H01Q 9/045; H01Q 1/523; H01Q 1/38; H01Q 1/48; H01Q 1/50; H01Q 1/521; H01Q 5/10; H01Q 5/335; H01Q 19/30; H01Q 1/243; H01Q 19/062; H01Q 19/06; H01Q 19/08; H01Q 1/24; H01Q 15/02–08;
(Continued)

(56) References Cited

U.S. PATENT DOCUMENTS 5,955,752 A 9/1999 Fukaya et al.
6,590,544 B1 * 7/2003 Filipovic .............. H01Q 19/062
343/753
(Continued)

FOREIGN PATENT DOCUMENTS

CN 111164608 A * 5/2020 ......... G06K 9/00046
DE 3931400 A1 * 12/2009 ............... F41G 7/28
(Continued)

OTHER PUBLICATIONS

Marcus et al, "Millimeter Wave Propagation: Spectrum Management Implications", IEEE Microwave Magazine, vol. 6, No. 2, pp. 54-62, Jun. 2005, doi: 10.1109/MMW.2005.1491267. (Year: 2005).*
(Continued)

*Primary Examiner* — Dameon E Levi
*Assistant Examiner* — Anh N Ho
(74) *Attorney, Agent, or Firm* — Slater Matsil, LLP

(57) ABSTRACT

An electronic device includes a housing, an electrically conductive layer and millimeter-wave (mmw) circuitry configured to emit a mmw signal. The mmw circuitry is arranged in the housing and on a first side of the electrically conductive layer. The housing comprises at least one portion configured as a dielectric lens to refract the mmw signal at least partially outside the housing towards a second side opposite to the first side of the electrically conductive layer.

23 Claims, 11 Drawing Sheets

(58) Field of Classification Search
CPC .......... G01S 13/56; G01S 7/028; G01S 13/86;
G01S 13/88; G06F 1/1684; G06F 1/1698;
G06F 3/017
See application file for complete search history.

(56) References Cited

U.S. PATENT DOCUMENTS

| | | | | |
|---|---|---|---|---|
| 10,804,615 | B2 * | 10/2020 | Shiozaki | H05K 7/1427 |
| 2016/0087344 | A1 * | 3/2016 | Artemenko | H01Q 21/29 |
| | | | | 343/753 |
| 2017/0201014 | A1 * | 7/2017 | Lee | H01Q 15/02 |
| 2019/0113609 | A1 * | 4/2019 | Baheti | H01Q 9/045 |
| 2020/0153115 | A1 * | 5/2020 | Yun | G06F 3/0412 |
| 2020/0212569 | A1 * | 7/2020 | Kumar | H01Q 21/065 |
| 2020/0280120 | A1 * | 9/2020 | Niakan | H01Q 21/28 |
| 2021/0159599 | A1 * | 5/2021 | Park | H01Q 1/243 |
| 2022/0109245 | A1 * | 4/2022 | Yang | H01Q 1/243 |

FOREIGN PATENT DOCUMENTS

| | | | | |
|---|---|---|---|---|
| EP | 1357395 | A1 | 10/2003 | |
| EP | 3490063 | A1 * | 5/2019 | ........... G01S 13/931 |
| EP | 3923019 | A1 * | 12/2021 | ............ G01S 13/88 |
| JP | 2019176271 | A * | 10/2019 | |
| KR | 20200131775 | A * | 11/2020 | |

OTHER PUBLICATIONS

"IEEE Standard Letter Designations for Radar-Frequency bands", IEEE Std 521-1984 (Year: 1984).*
Goettel et al, Packaging Solution for a Millimeter-Wave System-on-Chip Radar, 2018, IEEE, vol. 8, No. 1, p. 73-81 (Year: 2018).*

* cited by examiner

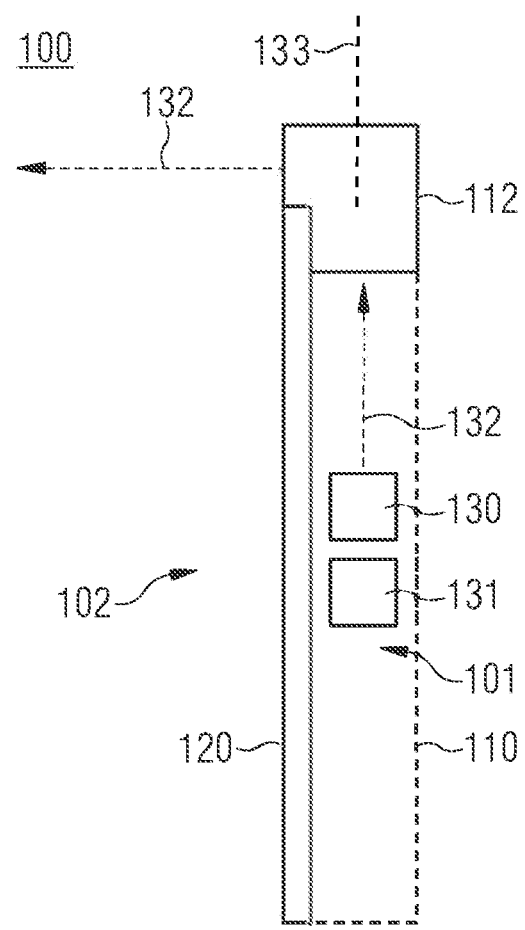

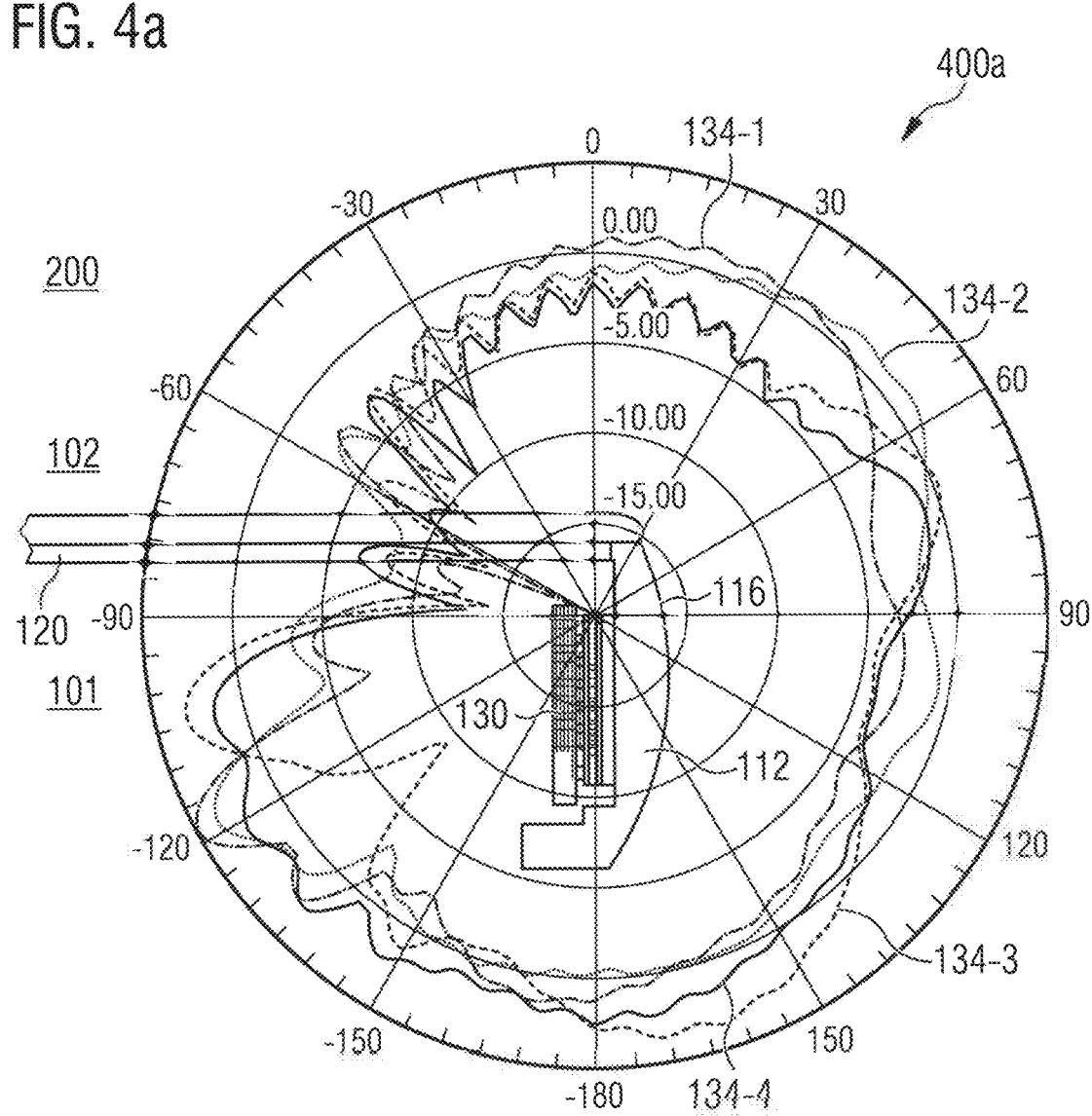

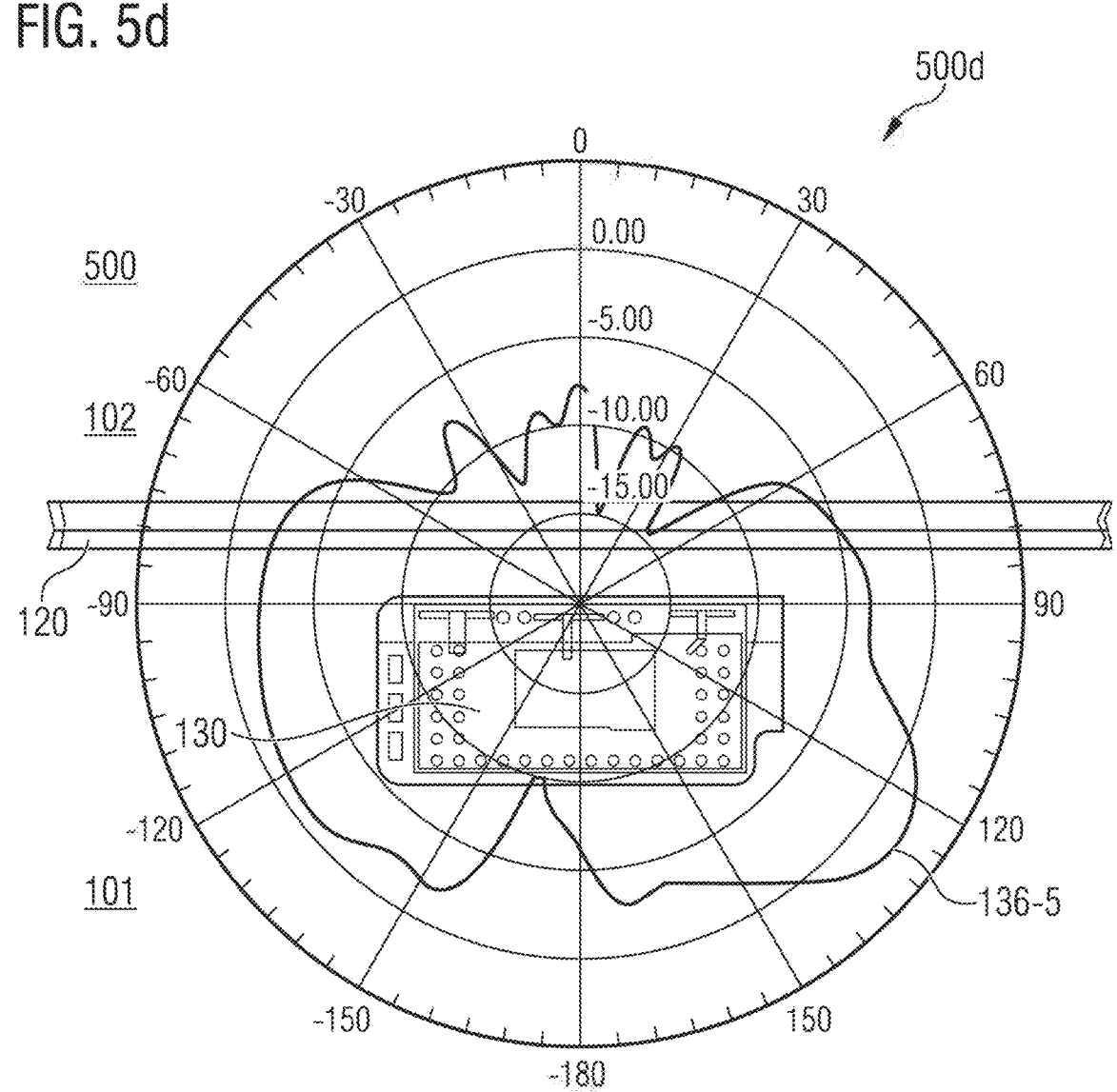

MILLIMETER-WAVE CIRCUIT WITH DIELECTRIC LENS

This application claims the benefit of European Patent Application No. 20194867, filed on Sep. 7, 2020, which application is hereby incorporated herein by reference in its entirety.

TECHNICAL FIELD

Embodiments of the present disclosure relate to a millimeter wave circuit with a dielectric lens.

BACKGROUND

Millimeter-wave circuitries (e.g. radar circuits) play an important role in electronic devices, for example, for gesture sensing/detection or movement detection purposes.

Radar circuitries, for example, are implemented in smartphones or tablets for gesture sensing and other use cases. In smartphones with "bezel less" touch displays, radar circuitry can merely be placed behind a touch-sensitive metal layer of the touch display. Due to its electrical properties, the metal layer may block a radar signal of the radar circuitry. Therefore, a radiation pattern of the radar signal may be insufficient, for example, for environment, object, movement, and/or gesture sensing.

SUMMARY

Some examples relate to an electronic device. The electronic device comprises a housing and an electrically conductive layer. Further, the electronic device comprises a millimeter-wave (mmw) circuitry configured to emit a mmw signal. The mmw circuitry is arranged in the housing and on a first side of the electrically conductive layer. The housing comprises at least one portion configured as a dielectric lens to refract the mmw signal at least partially outside the housing towards a second side opposite to the first side of the electrically conductive layer.

Some examples relate to a method for an electronic device which comprises a housing and an electrically conductive layer. The method comprises emitting a mmw signal using a mmw circuitry arranged in the housing and on a first side of the electrically conductive layer. Further, the method comprises refracting at least a part of the mmw signal outside the housing towards a second side opposite to the first side of the electrically conductive layer using a portion of the housing, the portion being configured as a dielectric lens.

BRIEF DESCRIPTION OF THE DRAWINGS

Some examples of apparatuses and/or methods will be described in the following by way of example only, and with reference to the accompanying figures, in which:

FIG. 1 schematically illustrates a cross-section of a first example of an electronic device equipped with millimeter-wave circuitry;

FIGS. 4a and 4b illustrate various exemplary radiation patterns from a top view and a side view;

FIGS. 5a, 5b, 5c, and 5d illustrate various other radiation patterns from a top view and a side view.

DETAILED DESCRIPTION OF ILLUSTRATIVE EMBODIMENTS

Figure 2A:
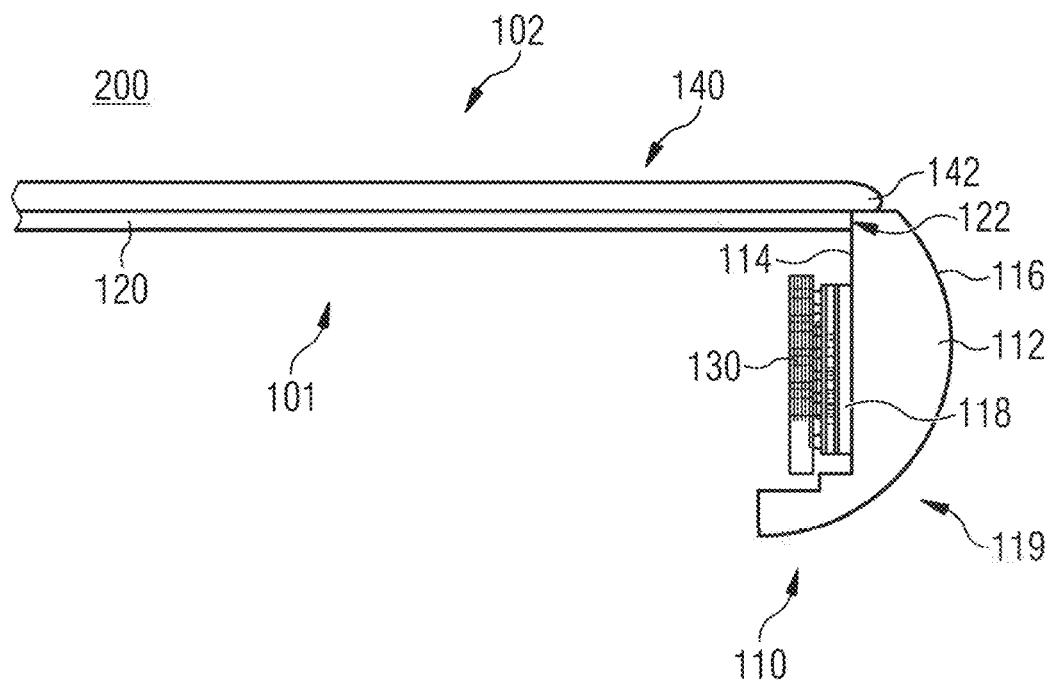
FIGS. 2a and 2b illustrate a cross-section and an oblique view of a second example of an electronic device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Some embodiments of the present disclosure relate to beam shaping of millimeter-wave radiation in electronic devices and a method for beam shaping.

FIG. 1 schematically illustrates a cross-section of an electronic device 100. The electronic device 100 comprises a housing 110, an electrically conductive layer 120, and a millimeter-wave, mmw, circuitry 130 configured to emit a mmw signal 132. In context of the present disclosure, the mmw circuitry 130 particularly may refer to a mmw device comprising a signal generation/processing circuitry, as well as one or more antennas to emit the mmw signal 132. The mmw circuitry 130 is arranged in the housing 110 and on a first side 101 of the electrically conductive layer 120. The housing 110 comprises a portion configured as a dielectric lens 112 to refract the mmw signal 132 at least partially outside the housing 110 towards a second side 102 opposite to the first side 101 of the electrically conductive layer 120. In other words, at least a part of the housing forms the dielectric lens 112, whose presence causes the radiation pattern of the mmw signal 132 to be enhanced at the second side of the electrically conductive layer 120. In FIG. 1, e.g., a (half-) space to the right of the electrically conductive layer 120 is to be understood as the first side 101 and a (half-) space to the left is to be understood as the second side 102.

The mmw circuitry 130, e.g., comprises signal generation circuitry (not shown) for generating the mmw signal 132 and transmit circuitry or a transmit antenna (not shown) to emit the mmw signal 132. In context of the present disclosure, the mmw signal 132 is to be understood as electromagnetic signal. In particular, the mmw signal 132 may have a frequency between 30 GHz and 300 GHz which, e.g., can be used for radar sensing. Accordingly, the mmw circuitry 130 may be configured as radar circuitry, e.g., for characterizing the environment of the electronic device 100 using the mmw signal 132.

The electrically conductive layer 120, for example, is part of a touchscreen, the housing 110, or another component of the electronic device 100. In the example of FIG. 1, the electrically conductive layer 120 is attached to the housing 110. In other examples, the electrically conductive layer 120 can be arranged differently in the electronic device 100. Due to its electrical characteristics, the electrically conductive layer 120 may block at least a portion of the mmw signal 132 emitted towards the second side 102.

In the example of FIG. 1, the housing 110 comprises a portion forming the dielectric lens 112. In the example of FIG. 1, the housing 110 comprises one dielectric lens. In particular, the dielectric lens 112 is formed by all or part of an edge portion of the housing 110. The edge portion, for example, is a part of a frame of the housing 110. For example, the dielectric lens 112 extends over a part of a length (e.g. a length of one side) of the frame. In other examples, the housing can also exhibit multiple dielectric lenses, e.g., to increase a portion of the mmw signal 132 refracted towards the second side 102.

The dielectric lens 112 may at least partially consist of dielectric/electrically insulating material transparent to the mmw signal 132. The dielectric material, e.g., is plastic. It is noted that also other dielectric/electrically insulating materials may constitute the dielectric lens 112. Optionally, one dielectric material or a composition of various different dielectric materials of the housing 110 may constitute the dielectric lens 112. For example, multiple stacked layers of different dielectric materials may form the dielectric lens 112. Further, the dielectric 112 lens may exhibit one or more phase transitions between the dielectric materials and/or an adjacent material or medium (e.g. air) to refract the mmw signal 132 at the phase transition. This particularly allows beam shaping of the mmw signal 132 for a modification of a radiation pattern of the mmw signal 132. In this regard, the dielectric lens 112 e.g. is configured to refract the mmw signal 132 impinging the dielectric lens 112 at least partially towards the second side 102. This allows the dielectric lens 112, e.g., to deflect the mmw signal 132 "around" the electrically conductive layer 120 towards the second side 102. In this way, the radiation pattern of the mmw signal 132 may be modified or enhanced to provide an increased and/or sufficient amount of the mmw signal 132 to the second side 102 for, e.g. object or gesture sensing.

The skilled person will understand that radiation beams propagating (exactly) in reverse direction through the dielectric lens 112 may follow the same path. Therefore, the dielectric lens 112 may be also configured to at least partly refract reflections of the mmw signal 132 from the second side 102 towards the mmw circuitry 130. The mmw circuitry 130 further may be configured to receive the reflections. The mmw circuitry 130, e.g., comprises one or more receive antennas (not shown) configured to receive the reflections. The reflections may be indicative of positions and/or velocities of objects on the second side 102 of the electrically conductive layer 120. Thus, the reflections of the mmw signal 132 may enable detection of objects, movements, and/or gestures on the second side 102 based on those reflections. To this end, the electronic device 100 my further comprise data processing circuitry 131 configured to detect movements of a user on the second side of the electrically conductive layer using the reflections. The data processing circuitry 131, e.g., can compare the mmw signal 132 and the reflections to determine a time of flight and/or a frequency shift of the reflections compared to the mmw signal 132 and to deter-mine the user's movements from the time of flight and/or the frequency shift.

The electronic device 100, for example, is a mobile device, a household electronics device, or an entertainment electronics device. In particular, the electronic device 100 can be a phone, a tablet, a television (TV), or the like.

Figure 2B:
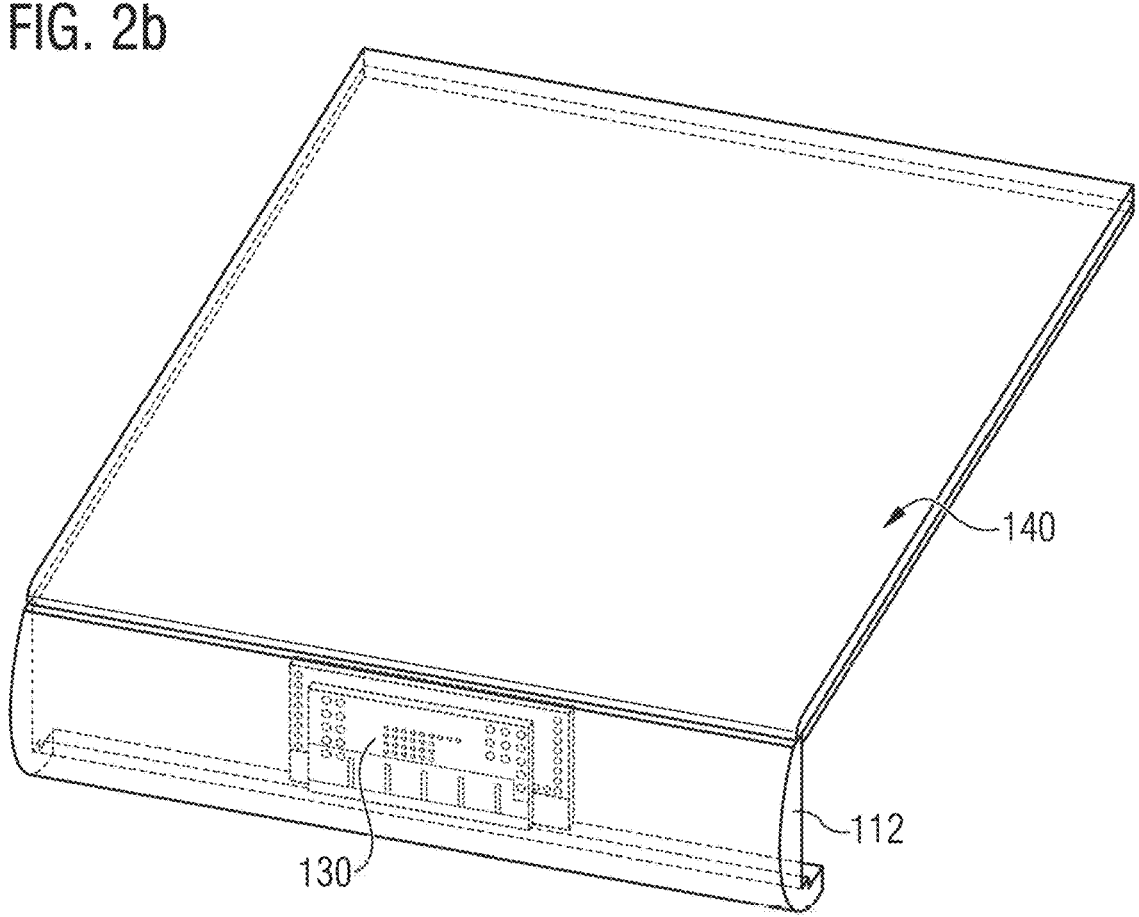

FIGS. 2a and 2b illustrate a cross-section and an oblique view of another electronic device 200. In comparison to the electronic device 100, the electronic device 200 further comprises a touchscreen 140 comprising a display 142. In the electronic device 200, the electrically conductive layer 120 forms a part of the touchscreen 140 for sensing touches. In particular, the electrically conductive layer 120 can be a metallic coating of the display 142. The electrically conductive layer 120, e.g., is used to generate an electrical field and sense disturbance of the electric field when the user touches the display 142. This allows touches of the user on the display 142 to be sensed based on the disturbance of the electrical field. The display 142, e.g., is arranged on the second side 102 of the electrically conductive layer 120. It is noted that the touchscreen may exhibit different architectures, e.g., in which the electrically conductive layer 120 and/or the display 142 are arranged and/or formed differently.

As can be seen in FIG. 2a, the dielectric lens 112 can be formed in an outer portion, e.g., in a frame 119 of the housing 110. The frame 119, e.g., surrounds an outer edge 122 of the electrically conductive layer 120. In other words, the electrically conductive layer 120 is framed in the housing 110. Also, the housing 110 may be attached to the display 142, e.g., closing the housing towards the second side 102. In other example, the (entire) touchscreen is framed in the housing 110 to firmly fix the touchscreen in the electronic device 200.

As can be seen from FIG. 2a, the dielectric lens 112 is partially arranged on the first side 101 of the electrically conductive layer 120 in order to intersect at least a portion of the mmw signal 132 emitted by the mmw circuitry 130 on the first side 101. In some examples, the dielectric lens is entirely arranged on the first side 101. Further, the dielectric lens 112 protrudes at least partially over the edge 122 of the electrically conductive layer 120 to deflect the mmw signal 132 around the electrically conductive layer 120. In the electronic device 200, e.g., the entire dielectric lens 112 protrudes over the edge 122. However, in other examples, merely a part of the dielectric lens 112, e.g., an exterior refractive surface forming an outer phase transition of the dielectric lens 112 partially protrudes over the edge 122.

The skilled person will understand that properties (e.g. lens type, refractive index, transparency, material composition) of the dielectric lens 112, a positioning (e.g. position or orientation) of the dielectric lens 112 and the mmw circuitry 130 with respect to each other and the electrically conductive layer 120, and an emission characteristic of the mmw circuitry 130 have influence on the radiation pattern of the mmw signal 132. In context of the present disclosure, the emission characteristic can be understood as an "unmodified" radiation pattern of a stand-alone application of the mmw circuitry 130. It is to be noted that various examples of the proposed architecture may exhibit, different lenses with different properties, different positionings of the dielectric lens 112 and the mmw circuitry 130, and/or different mmw circuitries 130 having different emission characteristics.

In the following some different architectures are exemplarily described.

The dielectric lens 112 can exhibit various different lens types. Exemplary lens types are simple lenses, such as convex or concave lenses, and compound lenses which comprise a combination of simple lenses. In the electronic device 200, the dielectric lens 112 may be a simple lens. The dielectric lens 112 e.g., is configured as a convex lens. Examples of convex lenses are plano-convex lenses having a planar face and a convex surface on opposite sides of the convex lens or biconvex lenses having oppositely formed convex surfaces on opposite sides of the convex lens. In the electronic device 200, e.g., the dielectric lens 112 is configured as a plano-convex lens having a planar face 114 and a convex surface 116 opposite to the planar face 114. The planar face 114 is turned towards the inside of the housing 110, whereas the convex surface 116 is turned outwards. Hence, the convex sur-face 116 can be understood as a refractive exterior surface.

It is noted that the dielectric lens 112 alternatively can exhibit another lens type, e.g., to provide a different radiation pattern. The dielectric lens 112, e.g., may be biconvex or a compound lens comprising a combination of a convex and a concave lens, e.g., exhibiting different or same dielectric materials.

Also, the positioning of the dielectric lens 112 and the mmw circuitry 130 may have an influence on the radiation pattern. In exemplary positionings, the mmw circuitry 130 may be either placed distant from the dielectric lens 112, as can be seen in FIG. 1, or may be attached adjacent to the dielectric lens 112, as shown in FIG. 2a. The skilled person will understand that the closer the mmw circuitry 130 is placed to the dielectric lens 112, the greater may be the portion of the mmw signal 132 impinging the dielectric lens 112 and thus, the greater may be the portion of the mmw signal 132 refracted towards the second side 102. Therefore, an increasing portion of the mmw signal 132 may be refracted towards the second side 102 the closer the mmw circuitry 130 is placed to the dielectric lens 112. In particular, this may enable a more precise and more reliable sensing of the environment, objects, movements, and/or gestures. In the electronic device 200, the mmw circuitry 130, e.g., is attached (adjacent) to the planar face 114 to increase a portion of the mmw signal 132 refracted towards the second side 102 vis-à-vis to other architectures, e.g., illustrated in FIG. 1.

In order to attach the transmit circuitry 130 to the dielectric lens 112, e.g., an adhesive 118 can be used. The adhesive 118 may be at least partly transmissive for the mmw signal 132 to direct the mmw signal 132 through the adhesive 118. The skilled person is aware that the higher the permeability of the adhesive for the mmw signal 132, the more intense may be the mmw signal 132 impinging the dielectric lens 112 and the more intense may be the mmw signal 132 on the second side 102. Alternatively, other means (e.g. clamps or screw connections) may be used to attach the mmw circuitry 130 to the dielectric lens 112. The mmw circuitry 130 may be also planar. Thus, it may be technically easier to attach the mmw circuitry 130 to the planar face 114 than to a curved face, e.g., of a biconvex lens.

It is noted that the mmw circuitry 130 can exhibit also different lateral displacements or orientations with respect to the dielectric lens 112 to, for example, effectuate different radiation patterns in some applications.

Also, the dielectric lens 112 can exhibit different orientations (with respect to the mmw circuitry 130). In particular, the orientation may be represented by an orientation of an optical axis 133 of the dielectric lens 112. The optical axis 133 is, e.g., to be understood as symmetry axis of the dielectric lens 112. In the electronic device 200, the planoconvex dielectric lens 112 is arranged such that the planar surface 114 is perpendicular to the electrically conductive layer 120. Thus, an optical axis 133 of the dielectric lens 112 may be parallel to the electrically conductive layer 120. As can be seen from FIG. 2a, the above proposed orientation of the dielectric lens 112 may particularly allow a more spacesaving implementation of the dielectric lens 112 as if the dielectric lens 112 was inclined differently relative to the electrically conductive layer 120.

The radiation pattern may also depend on a shape of the dielectric lens 112. In the electronic device 200, the radiation pattern may particularly depend on a radius or curvature of the convex surface 116. The exterior refractive surface/convex surface 116, e.g., has a radius between 3 mm and 7 mm. Dielectric lenses with such radii may be easily implemented in frames of existing smartphone or tablet housings. It is noted that, in other examples, the exterior refractive surface may also exhibit another radius less than 3 mm or greater than 7 mm. The skilled person will understand that also for other lens types (e.g. biconvex lens), the dielectric lens 112 may exhibit different shapes. In general, the dielectric lens 112 may also exhibit a different, e.g., an elliptical or an asymmetric or shape.

Figure 3A:
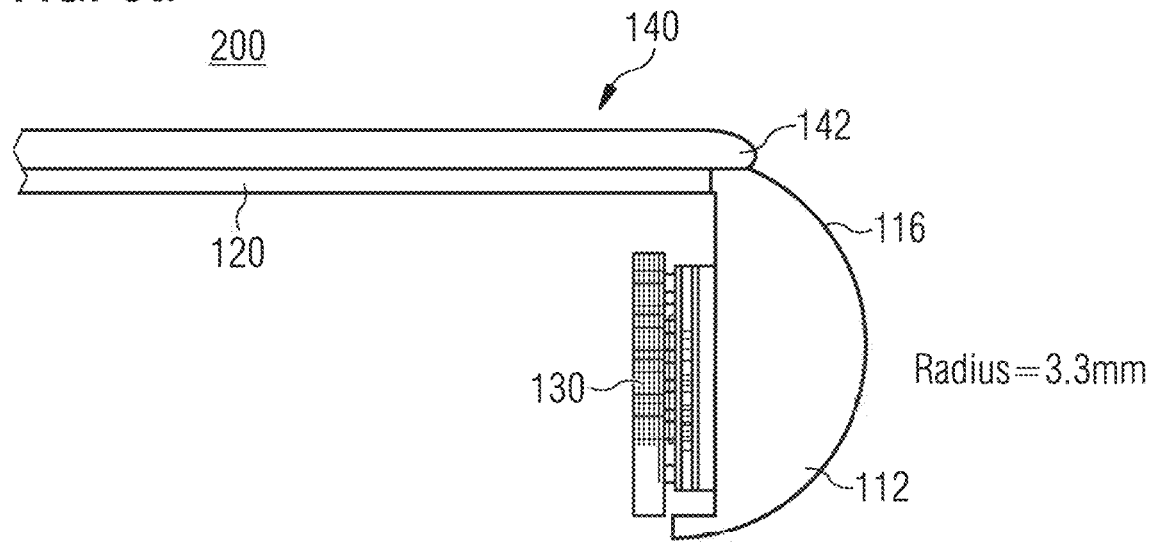
FIGS. 3a, 3b, 3c, and 3d illustrate various examples of dielectric lenses having different radii.
Figure 3B:
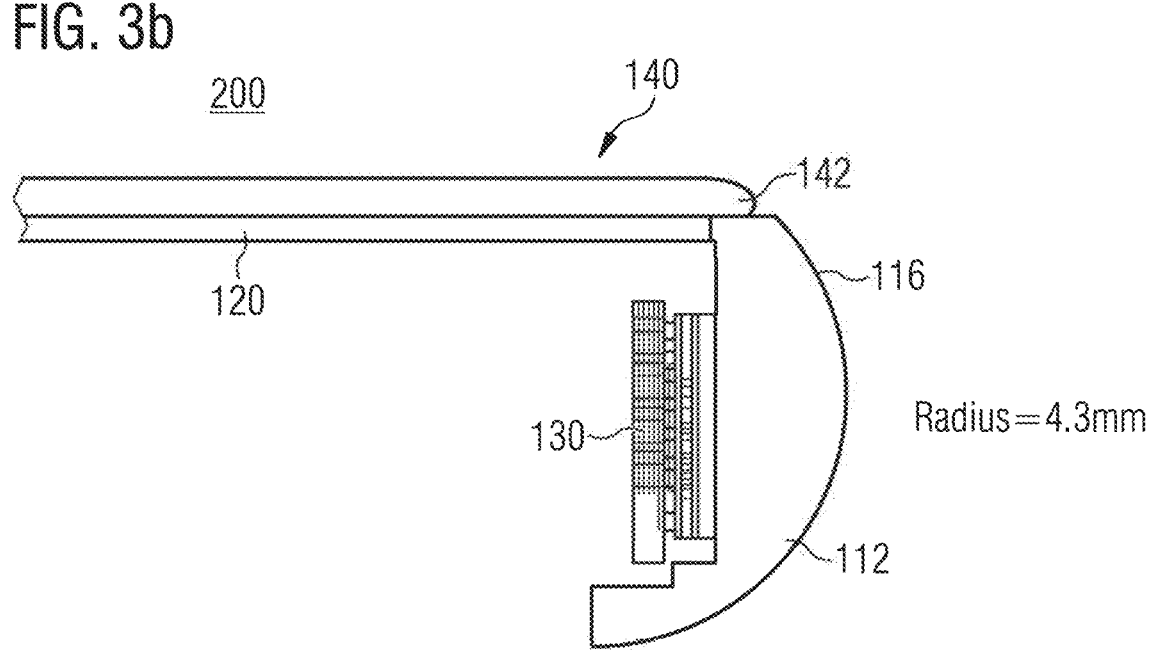
Figure 3C:
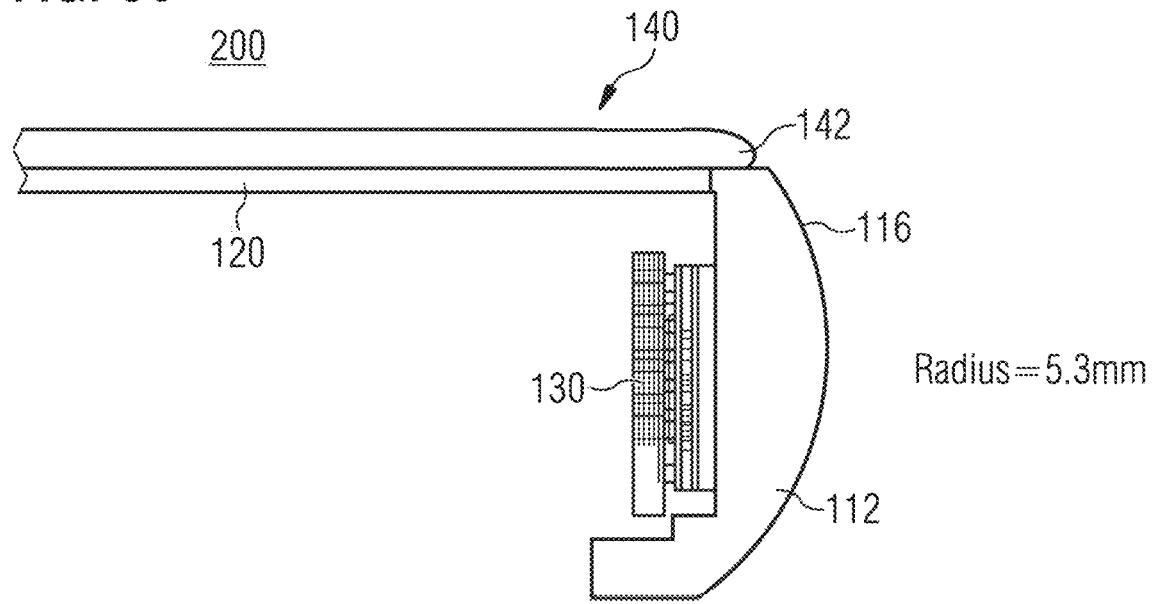
Figure 3D:
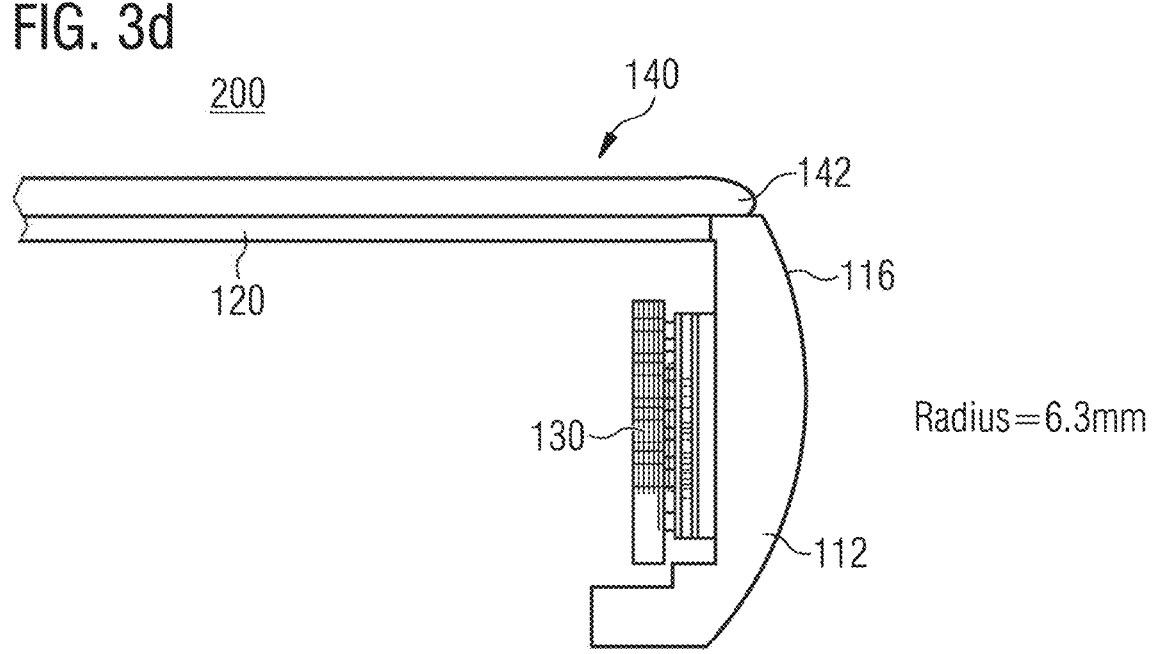

FIG. 3a, FIG. 3b, FIG. 3c, and FIG. 3d each illustrate a cross-section of the electronic device 200, whereas the dielectric lens 112 has different radii in FIG. 3a, . . . , and FIG. 3d.

In the example of FIG. 3a, the convex surface 116 of the dielectric lens 112 has a radius of 3.3 mm. In FIG. 3b, the convex surface 116 has a radius of 4.3 mm. As can be seen in FIG. 3c, the convex surface 116 may also exhibit a radius of 5.3 mm. In the example of FIG. 3d, the convex surface 116 of the dielectric lens 112 has a radius of 6.3 mm. The skilled person will understand that the radiation pattern of the mmw signal 132 may be different for the different radii of the dielectric lens 112, as illustrated with reference to FIGS. 4a and 4b in more detail.

Figure 4B:
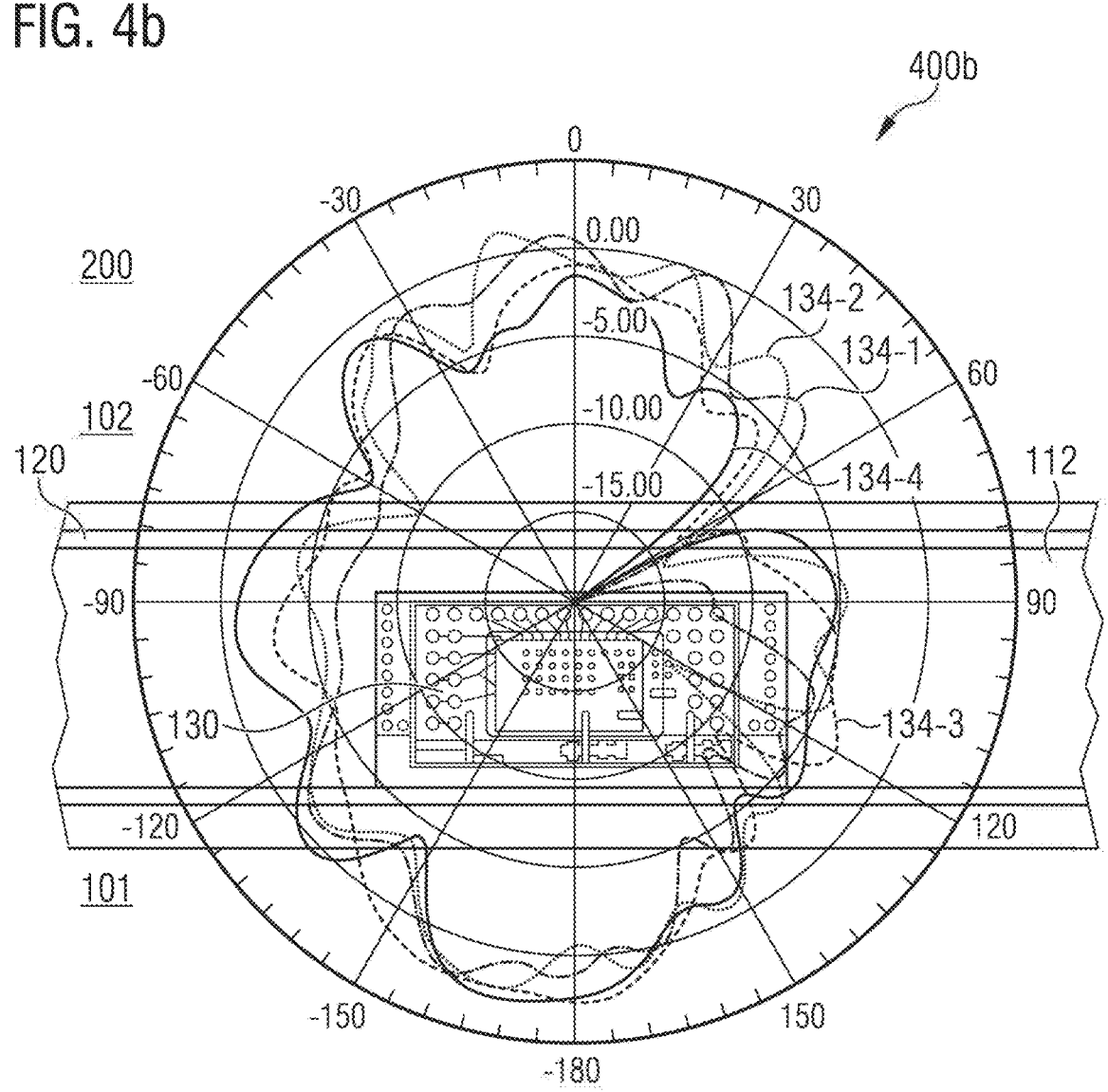

FIGS. 4a and 4b illustrate various exemplary radiation patterns 134-1, 134-2, 134-3, and 134-4 of the mmw signal 132 for the different radii of the dielectric lens from a top view and a side view.

FIG. 4a shows a polar diagram 400a, whereas an angle of the polar diagram 400a denotes a radiation angle in a vertical plane of the mmw circuitry 130 with respect to a perpendicular to the electrically conductive layer 120, and a distance from a point of origin of the polar diagram 400a denotes an intensity of the mmw signal 132 in a respective radiation angle. The point of origin, e.g., is a point on the mmw circuitry 130.

The radiation patterns 134-1, 134-2, 134-3, and 134-4, e.g., relate to different radii for the convex surface 116 of the dielectric lens 112. For example, 134-1 relates to the radius of 3.3 mm, 134-2 to the radius of 4.3 mm, 134-3 to the radius of 5.3 mm, and 134-4 to the radius of 6.3 mm.

In diagram 400a, a portion of the radiation pattern between an angle of −90° and 90° indicates an amount of the mmw signal 132 on the second side, whereas another portion of the radiation pattern for angles of more than 90° or less than −90° indicates an amount of the mmw signal 132 on the first side of the electrically conductive layer 120.

As can be seen from the polar diagram 400a, the different radiation patterns 134-1, 134-2, 134-3, and 134-4 may exhibit different intensities with respect to each other for different radiation angles. Radiation pattern 134-1, e.g., has the highest intensity among the 134-1, 134-2, 134-3, and 134-4 at a radiation angle of 0° in the vertical plane. Thus, the radius of 3.3 mm for the convex surface 116 may be preferred over the larger radii 4.3 mm, 5.3 mm, and 6.3 mm to provide a maximal intensity at a radiation angle of 0° using one of the aforementioned radii. Depending on requirements on the radiation pattern in different applications, either one of the above radii may be used. Alternatively, a different radius may be used.

FIG. 4b shows the radiation patterns 134-1, 134-2, 134-3, and 134-4 for different radii of the convex surface 116 from top view and in a horizontal plane of the mmw circuitry 130. In particular, the radiation patterns 134-1, 134-2, 134-3, and 134-4 are plotted in the polar diagram 400b, whereas an angle of the polar diagram 400b denotes a radiation angle with respect to a perpendicular to the electrically conductive layer 120. A distance from a point of origin of the polar diagram 400a denotes an intensity of the mmw signal 132 in a respective radiation angle.

Again, a portion of the radiation pattern between an angle of −90° and 90° indicates an amount of the mmw signal 132 on the second side, whereas another portion of the radiation pattern for angles of more than 90° or less than −90° indicates an amount of the mmw signal 132 on the first side of the electrically conductive layer 120.

Again, the different radiation patterns 134-1, 134-2, 134-3, and 134-4 at least partly differ from each other. Radiation pattern 134-1, e.g., has the highest intensity among the 134-1, 134-2, 134-3, and 134-4 at a radiation angle of 0° in the horizontal plane. Therefore, the radiation pattern 134-1 may be preferred over 134-2, 134-3, and 134-4 in some applications. In other applications, different radiation pattern and thus, different radii may be preferred.

The radiation pattern of the mmw signal 132 may also depend on the emission characteristic of the mmw circuitry 130. The emission characteristic particularly may depend on an antenna (e.g. antenna type) used in the mmw circuitry 130 to emit the mmw signal 132. In the example of FIGS. 4a and 4b, e.g., the mmw circuitry 130 comprises a slot-antenna to emit the mmw signal 132. It is noted that other antenna types may be used as well in other examples. For example, the mmw circuitry 130 may comprise a Yagi antenna to emit the mmw signal 132.

Figure 5A:
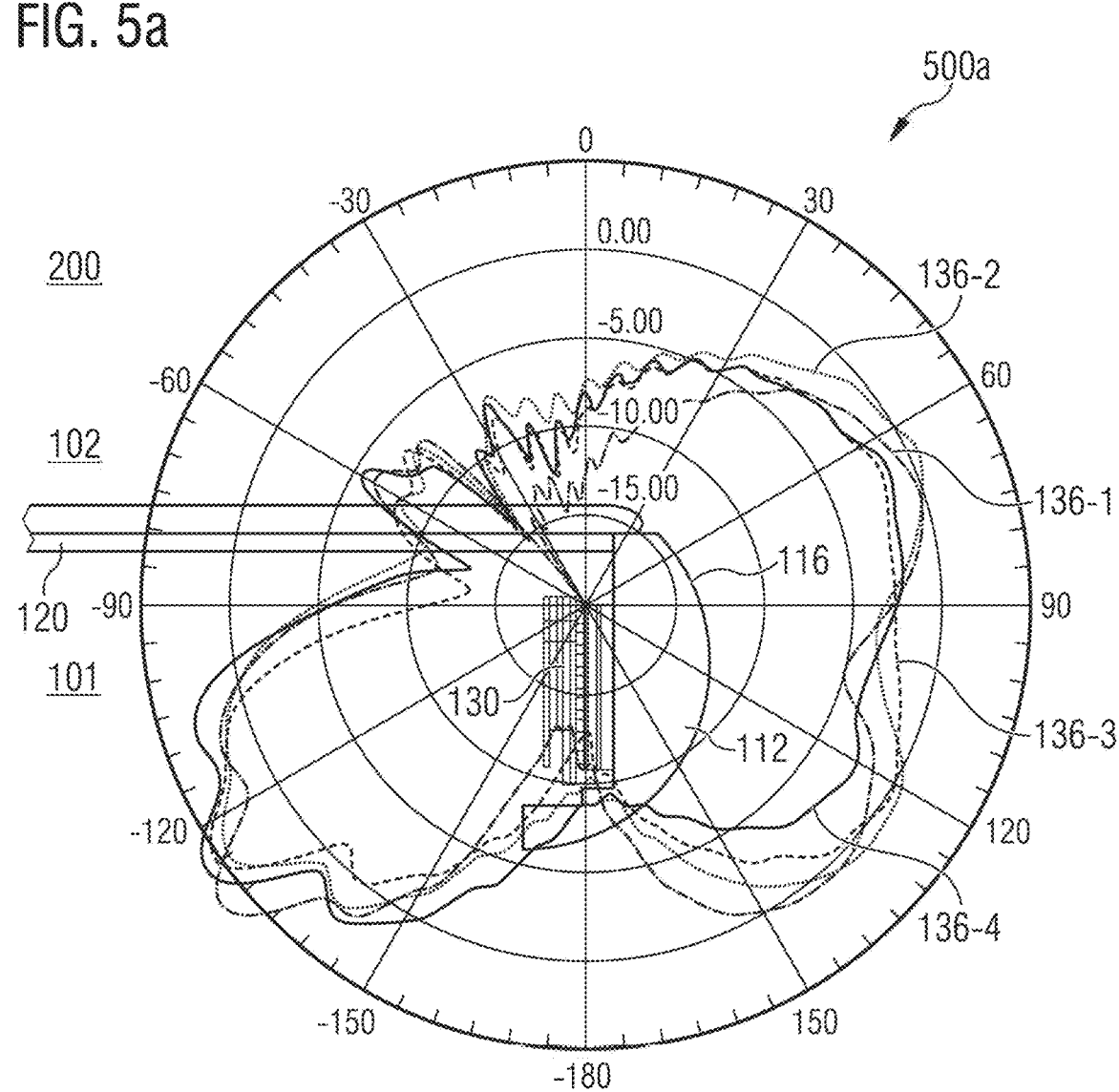
Figure 5B:
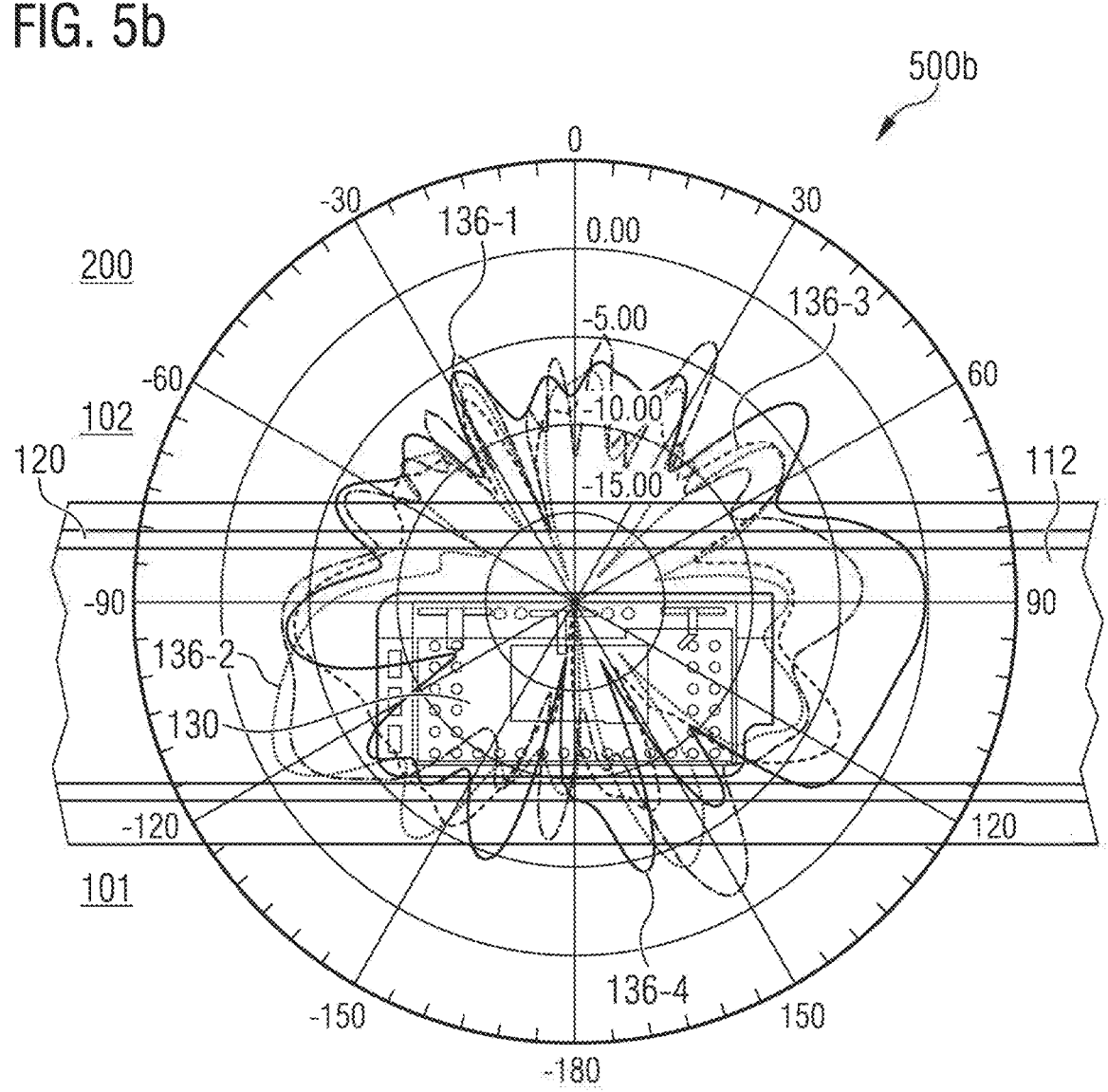

FIG. 5a and FIG. 5b illustrate various exemplary radiation patterns 136-1, 136-2, 136-3, and 136-4 of the mmw signal 132 emitted by a Yagi antenna. Again, the radiation pattern 136-1, 136-2, 136-3, and 136-4 relate to different radii of the dielectric lens 112. FIG. 5a, for example, illustrates the radiation patterns 136-1, 136-2, 136-3, and 136-4 plotted in a polar diagram 500a equivalent to the polar diagram 400a, and FIG. 5b illustrates the radiation patterns 136-1, 136-2, 136-3, and 136-4 plotted in a polar diagram 500b equivalent to the polar diagram 400b. Also, the radiation patterns 136-1, 136-2, 136-3, and 136-4 differ from each other for different radii of the convex surface 116. Moreover, the radiation patterns 136-1, 136-2, 136-3, and 136-4 at least partially differ from the radiation patterns 134-1, 134-2, 134-3, and 134-4. In different examples, the mmw circuitry 130 may there-fore comprise different antennas and/or the dielectric lens 112 may exhibit different radii.

As previously explained, the dielectric lens 112 may enhance the radiation pattern, e.g., to provide a sufficient intensity of the mmw signal 132 on the second side 102 for sensing the environment, objects, movements, and/or gestures. This can be exemplarily illustrated with reference to a comparison between FIG. 5a and FIG. 5c and between FIGS. 5b and 5d.

Figure 5C:
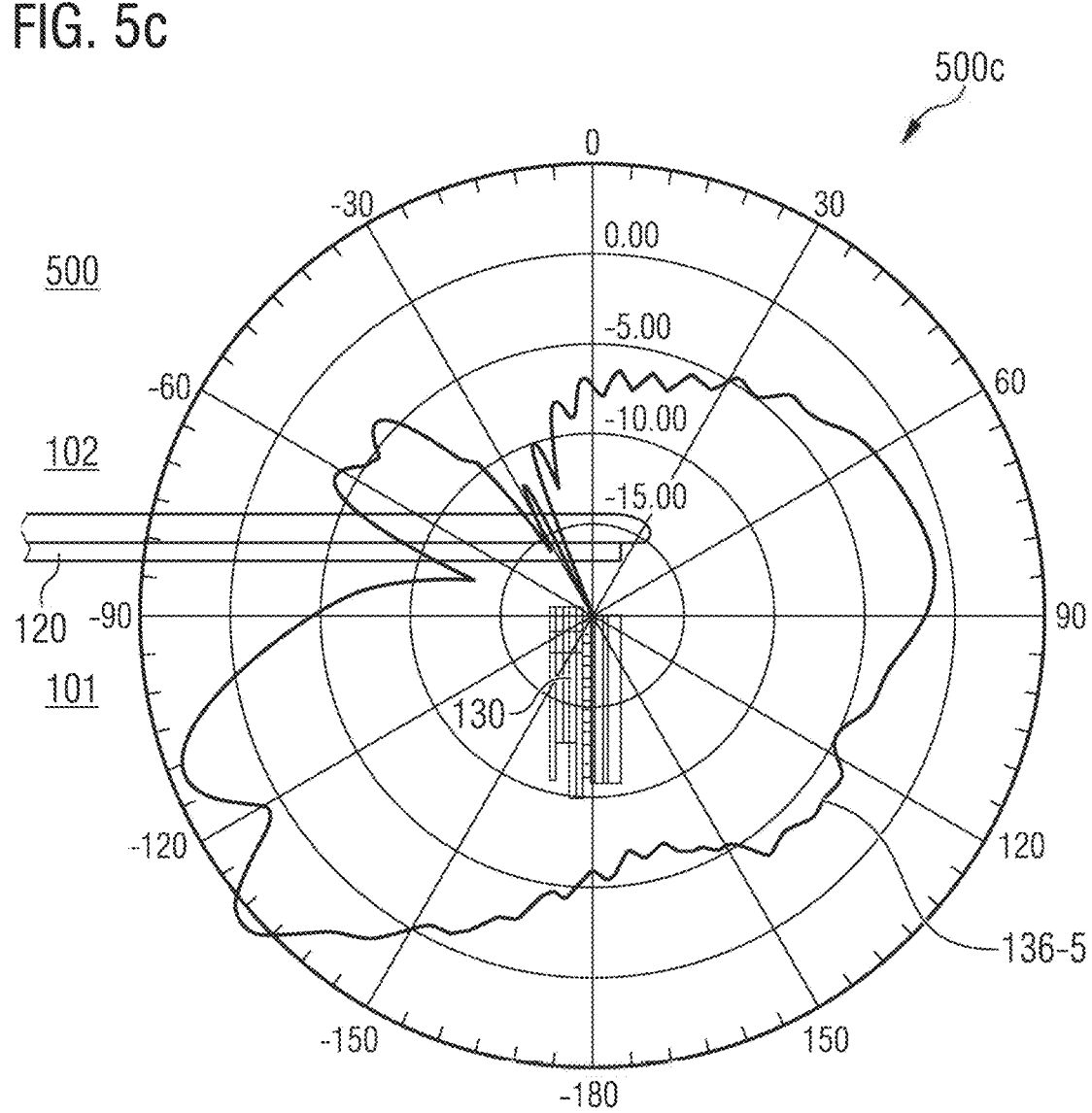

FIG. 5c and FIG. 5d illustrate a radiation pattern 136-5 of an electronic device 500 in the vertical plane and in the horizontal plane, respectively, in a polar diagram 500c and 500d equivalent to the polar diagrams 500a and 500b, respectively. For reasons of comparability, the electronic device 500 may also exhibit a similar touchscreen 140 and similar mmw circuitry 130. The mmw circuitry 130 further may also comprise a Yagi antenna to emit the mmw signal 132. In comparison to the electronic device 200, the electronic device 500 does not exhibit a (dielectric) lens.

As can be seen from a comparison of FIG. 5a and FIG. 5c, e.g., the radiation patterns 136-1, 136-2, 136-3, and 136-4 differ from the radiation pattern 136-5. In particular, the radiation patterns 136-1, 136-2, 136-3, and 136-4 may at least partly exhibit a higher intensity of the mmw signal 132 on the second side 102 than 136-5. For example, the radiation pattern 136-2 has a higher intensity at a radiation angle of −25° in the vertical plane than the radiation pattern 136-5. Similarly, it can be seen from a comparison of FIGS. 5b and 5d that the radiation pattern 136-2 has a higher intensity than the radiation pattern 136-5 at the radiation angle of 5° in the horizontal plane. Hence, the radiation patterns 136-1, 136-2, 136-3, and 136-4 may enable at least at some radiation angles a higher accuracy and/or reliability in environment, object, movement, and/or gesture sensing than the radiation pattern 136-5. In particular, the radiation patterns 136-1, 136-2, 136-3, and 136-4 enabled by the dielectric lens 112 may allow a more reliable and/or precise sensing of objects, the environment, movements, and/or gestures on the second side 102.

The skilled person will understand that the above proposed architecture may also enable a more reliable and/or more precise sensing of the environment, objects, movements, and/or gestures using another lens type (e.g. a biconvex lens or a compound lens), other shapes of the dielectric lens 112, other (transmissive, dielectric) materials for the dielectric lens 112, another radius for the dielectric lens 112, different antennas (e.g. a slot antenna), and/or a different positioning of the dielectric lens 112, the mmw circuitry 130 and/or the electrically conductive layer 120 to each other.

Figure 6:
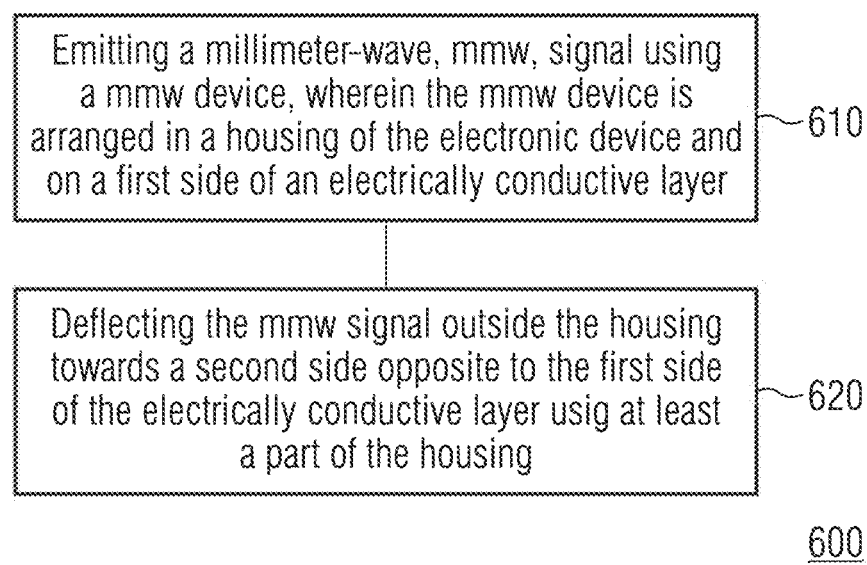
FIG. 6 illustrates a method for an electronic device.

A flow chart of an equivalent method 600 for the electronic devices 100 and/or 200, which exhibit a housing and an electrically conductive layer, is illustrated in FIG. 6.

Method 600 comprises emitting 610 a mmw signal using a mmw circuitry arranged in the housing and on a first side of the electrically conductive layer. Further, method 600 comprises refracting 620 at least a part of the mmw signal outside the housing towards a second side opposite to the first side of the electrically conductive layer using a portion of the housing which is configured as dielectric lens.

As described above, the electrically conductive layer may block the mmw signal at least partially due to its electrical properties. The dielectric lens, e.g., is formed in an outer portion of the housing, which may at least partially be arranged on the first side and protrude over an outer edge of the electrically conductive layer to deflect the mmw signal around the electrically conductive layer. For the details, it is referred to the above description of the electronic devices 100 and 200.

The examples described herein can be summarized as follows:

Some examples relate to an electronic device. The electronic device comprises a housing, an electrically conductive layer, and millimeter-wave, mmw, circuitry. The mmw circuitry is configured to emit a mmw signal. The mmw circuitry is arranged in the housing and on a first side of the electrically conductive layer. The housing has at least one portion configured as a dielectric lens to refract the mmw signal at least partially outside the housing towards a second side opposite to the first side of the electrically conductive layer.

According to some examples, the dielectric lens is configured to refract reflections of the mmw signal at least partially from the second side towards the mmw circuitry. Also, the mmw circuitry may be further configured to receive the reflections.

In some examples, the electronic device further comprises a data processing circuitry configured to detect movements of a user on the second side of the electrically conductive layer using the reflections.

According to some examples, the dielectric lens is formed by all or part of an edge portion of the housing.

In some examples, the dielectric lens is at least partly arranged on the first side of the electrically conductive layer and at least partially protrudes over an edge of the electrically conductive layer.

According to some examples, the mmw circuitry is attached to the dielectric lens.

In some examples, the dielectric lens is a convex lens.

According to some examples, the dielectric lens is a plano-convex lens. Also, the mmw circuitry may be attached to a planar face of the plano-convex lens.

In some examples, an optical axis of the dielectric lens is parallel to the electrically conductive layer.

According to some examples, a refractive exterior surface of the dielectric lens has a radius between 3 mm and 7 mm.

In some examples, the electronic device further comprises a touchscreen. Also, the electrically conductive layer may form a part of the touchscreen for sensing touches.

According to some examples, the touchscreen is framed in the housing.

In some examples, the mmw signal has a frequency between 30 GHz and 300 GHz.

According to some examples, the mmw circuitry comprises at least one slot antenna configured to emit the mmw signal.

In some examples, the mmw circuitry comprises at least one Yagi antenna to emit the mmw signal.

Some examples relate to a method for an electronic device, wherein the electronic device comprises a housing and an electrically conductive layer. The method comprises emitting a mmw signal using a mmw circuitry arranged in the housing and on a first side of the electrically conductive layer. The method also comprises refracting at least a part of the mmw signal outside the housing towards a second side opposite to the first side of the electrically conductive layer using a portion of the housing configured as dielectric lens.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An electronic device comprising:
   a housing;
   an electrically conductive layer; and
   millimeter-wave (mmw) circuitry comprising an antenna configured to emit a mmw signal in a direction parallel to the electrically conductive layer, and signal generation circuitry configured to generate the mmw signal, wherein the mmw circuitry is arranged in the housing, and located at a first side of the electrically conductive layer,
   wherein the housing comprises at least one portion configured as a dielectric lens to refract the mmw signal from the first side of the electrically conductive layer towards a second side of the electrically conductive layer opposite to the first side of the electrically conductive layer, wherein the mmw circuitry is located completely behind the electrically conductive layer at the first side of the electrically conductive layer with respect to the second side of the electrically conductive layer, wherein the dielectric lens extends over a portion of the electrically conductive layer at a corner of the housing, at least a portion of the dielectric lens has an unobstructed view of the second side of the electrically conductive layer in a direction perpendicular to the electrically conductive layer, and the dielectric lens is configured to change a direction of the mmw signal from the direction parallel to the electrically conductive layer to the direction perpendicular to the electrically conductive layer.

2. The electronic device of claim 1, wherein the dielectric lens is configured to refract reflections of the mmw signal at least partially from the second side towards the mmw circuitry, and wherein the mmw circuitry is further configured to receive the reflections.

3. The electronic device of claim 2, further comprising data processing circuitry configured to detect movements of a user on the second side of the electrically conductive layer using the reflections.

4. The electronic device of claim 1, wherein the dielectric lens is formed by all or part of an edge portion of the housing.

5. The electronic device of claim 1, wherein the dielectric lens is at least partly arranged on the first side of the electrically conductive layer and at least partially protrudes over an edge of the electrically conductive layer.

6. The electronic device of claim 1, wherein the mmw circuitry is attached to the dielectric lens.

7. The electronic device of claim 1, wherein the dielectric lens is a convex lens.

8. The electronic device of claim 1, wherein the dielectric lens is a plano-convex lens, and wherein the mmw circuitry is attached to a planar face of the plano-convex lens.

9. The electronic device of claim 1, wherein an optical axis of the dielectric lens is parallel to the electrically conductive layer.

10. The electronic device of claim 1, wherein a refractive exterior surface of the dielectric lens comprises a radius between 3 mm and 7 mm.

11. The electronic device of claim 1, further comprising a touchscreen for sensing touches, wherein the electrically conductive layer forms a part of the touchscreen.

12. The electronic device of claim 1, wherein the mmw signal has a frequency between 30 GHz and 300 GHz.

13. The electronic device of claim 1, wherein the mmw circuitry comprises at least one slot antenna configured to emit the mmw signal.

14. The electronic device of claim 1, wherein the mmw circuitry comprises at least one Yagi antenna to emit the mmw signal.

15. The electronic device of claim 1, wherein the dielectric lens is directly attached to the mmw circuitry via an adhesive disposed within a signal path of the mmw signal, and the adhesive is at least partly transmissive for the mmw signal.

16. A method for an electronic device comprising a housing and an electrically conductive layer, the method comprising:

generating and emitting a millimeter-wave (mmw) signal using a mmw circuitry comprising generation circuitry configured to generate the mmw signal, and an antenna arranged in the housing and on a first side of the electrically conductive layer; and refracting the mmw signal from the first side of the electrically conductive layer towards a second side of the electrically conductive layer opposite to the first side of the electrically conductive layer using a portion of the housing configured as a dielectric lens, wherein the mmw circuitry is located completely behind the electrically conductive layer at the first side of the electrically conductive layer with respect to the second side of the electrically conductive layer, and refracting comprises changing a direction of the mmw signal from the direction parallel to the electrically conductive layer to the direction perpendicular to the electrically conductive layer, and wherein the dielectric lens extends over a portion of the electrically conductive layer at a corner of the housing, and at least a portion of the dielectric lens has an unobstructed view of the second side of the electrically conductive layer in a direction perpendicular to the electrically conductive layer.

17. The method of claim 16, further comprising:
refracting a reflected mmw signal using the portion of the housing configured as the dielectric lens; and
receiving the refracted reflected mmw signal using the mmw circuitry.

18. The method of claim 16, wherein the dielectric lens is directly attached to the mmw circuitry via an adhesive disposed within a signal path of the mmw signal, and the adhesive is at least partly transmissive for the mmw signal.

19. A touchscreen system comprising:

a touchscreen display comprising an electrically conductive layer, the touchscreen display comprising a region configured to sense a disturbance of an electric field when a user touches the touchscreen display on a first surface disposed on a front side of the electrically conductive layer;

millimeter-wave (mmw) radar circuitry comprising signal generation circuitry configured to generate a mmw signal, and an antenna disposed on a back side of the electrically conductive layer opposite the front side; and a dielectric lens disposed at an edge portion of the touchscreen display, the dielectric lens configured to refract the mmw signal generated by the mmw radar circuitry from the back side of the electrically conductive layer towards the front side of the electrically conductive layer, wherein the mmw radar circuitry is located completely behind the electrically conductive layer at the back side of the electrically conductive layer with respect to the front side of the electrically conductive layer, and wherein the dielectric lens extends over a portion of the electrically conductive layer, at least a portion of the dielectric lens has an unobstructed view of the back side of the electrically conductive layer in a direction perpendicular to the electrically conductive layer, and the dielectric lens is configured to change a direction of the mmw signal from the direction parallel to the electrically conductive layer to the direction perpendicular to the electrically conductive layer.

20. The touchscreen system of claim 19, further comprising data processing circuitry coupled to the mmw radar circuitry, the data processing circuitry configured to detect movements of the user on the front side of the electrically conductive layer via the refracted mmw signal.

21. The touchscreen system of claim 19, wherein the dielectric lens is a plano-convex lens, and wherein the mmw radar circuitry is attached to a planar face of the plano-convex lens.

22. The touchscreen system of claim 19, wherein an optical axis of the dielectric lens is parallel to the electrically conductive layer.

23. The touchscreen system of claim 19, wherein the dielectric lens is directly attached to the mmw circuitry via an adhesive disposed within a signal path of the mmw signal, and the adhesive is at least partly transmissive for the mmw signal.

* * * * *